Dec. 21, 1948.   W. M. HUTCHISON   2,456,875
MOTOR CONTROL SYSTEM
Filed Oct. 29, 1943
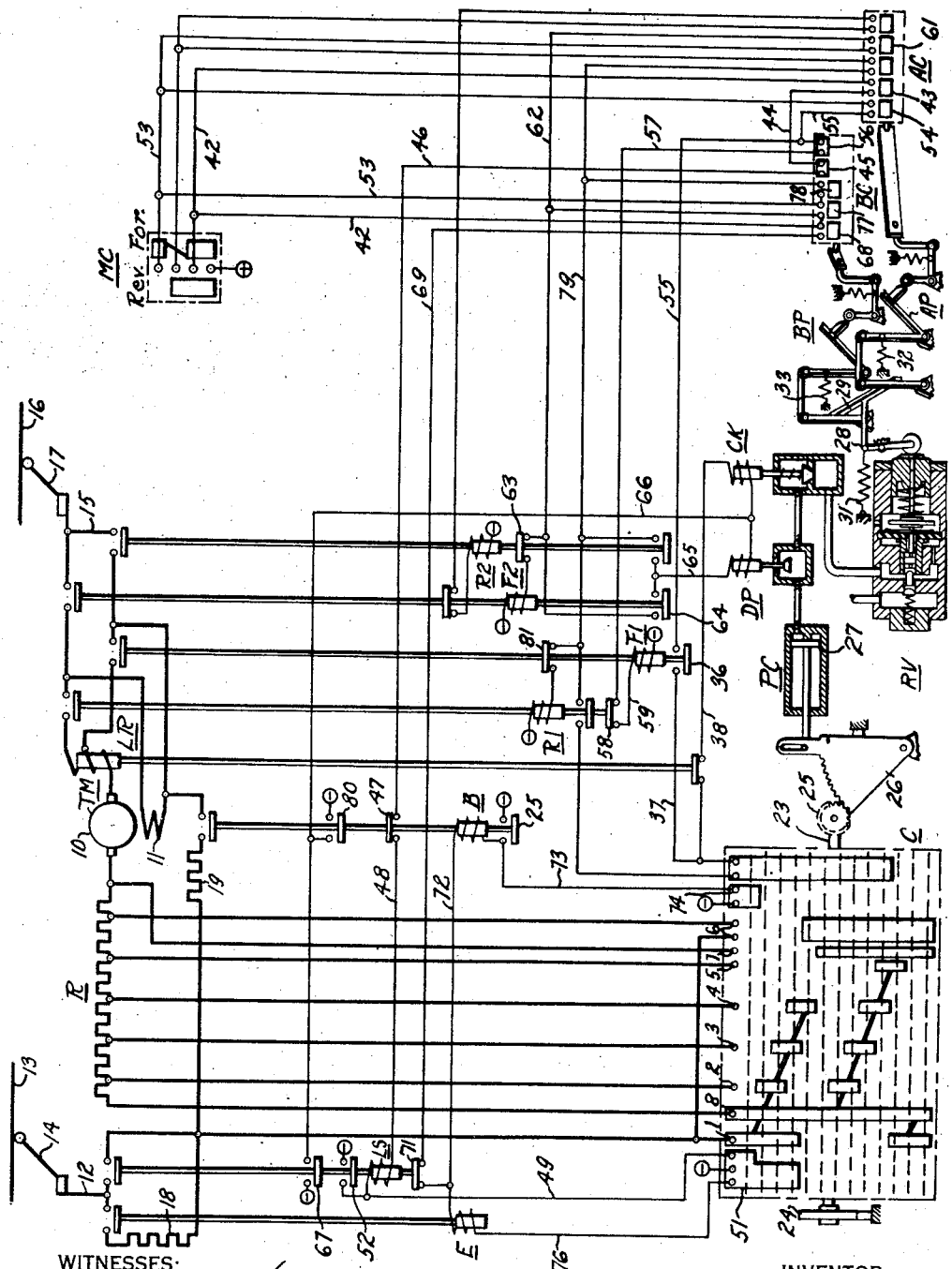
WITNESSES:   INVENTOR
   William M. Hutchison.
   BY
   ATTORNEY Patented Dec. 21, 1948

2,456,875

UNITED STATES PATENT OFFICE 2,456,875

MOTOR CONTROL SYSTEM

William M. Hutchison, Pittsburgh, Pa., assignor to Westinghouse Electric Corporation, East Pittsburgh, Pa., a corporation of Pennsylvania Application October 29, 1943, Serial No. 508,264

7 Claims. (Cl. 318—390)

My invention relates, generally, to control systems and, more particularly, to systems for controlling the operation of the propelling motors of electric vehicles, such as trolley coaches and the like.

The copending application of L. G. Riley, Serial No. 508,265, filed October 29, 1943, discloses a motor control system in which the operation of a pneumatically-actuated controller is controlled by a pressure regulating valve which is so adjusted by a manually-operated pedal that the pressure in the air cylinder which actuates the controller is in direct proportion to the movement of the manually-operated pedal. The operation of the regulating valve may be controlled by either an accelerating pedal or a brake pedal. Unsatisfactory operation of such a system may result from failure of the controller to return to its initial or off position when either pedal is released because of air being trapped in the cylinder which actuates the controller.

An object of my invention is to insure the prompt return of a pneumatically-actuated controller to its initial position when pressure is released from the means for controlling the movement of the controller.

Another object of my invention is to prevent the trapping of air in the actuating cylinder for a controller when one means for controlling the movement of the controller is released and another controlling means is immediately operated.

A more general object of my invention is to provide a control system which shall be simple and efficient in operation and which may be economically manufactured and installed.

Other objects of my invention will be explained fully hereinafter or will be apparent to those skilled in the art.

In accordance with one embodiment of my invention, an electrically-operated relief or dump valve is so connected in a system for controlling the operation of a pneumatically-actuated controller that satisfactory operation of the control system is insured regardless of the manner of manipulating the controlling means for the controller.

For a fuller understanding of the nature and objects of my invention, reference may be had to the following detailed description, taken in conjunction with the accompanying drawing, in which the single figure is a diagrammatic view of a control system embodying the principal features of my invention.

Referring to the drawing, the system shown therein comprises a traction motor TM having an armature winding 10 and a series field winding 11; a line switch LS for connecting the motor TM to a power conductor 12 which may be energized from a trolley conductor 13 through a current-collecting device 14; a plurality of reversing switches F1, F2, R1 and R2 for controlling the direction of operation of the motor TM and also for connecting the motor to a power conductor 15 which is connected to a trolley conductor 16 through a current-collecting device 17; a switch B which cooperates with certain of the reversing switches to establish dynamic braking connections for the motor TM and a switch E which connects the field winding 11 of the motor TM to the power conductor 12, thereby exciting the motor field during dynamic braking. A resistor 18 is connected in the excitation circuit for the field winding 11, and a resistor 19 is connected in both the field excitation circuit and the dynamic braking circuit for the motor TM.

The motor current is controlled both during acceleration and dynamic braking by a resistor R which is shunted from the motor circuit step-by-step by a controller C which is provided with a plurality of contact members 1 through 8, inclusive, for shunting the resistor R. The controller C is actuated in one direction by a shaft 23, and is returned to the position shown in the drawing by a spiral spring 24.

As shown, the controller shaft 23 is driven by a pinion 25 which, in turn, is driven by a gear sector 26. The sector 26 is actuated by a piston 27 disposed in cylinder PC. As described in the aforesaid copending application, the fluid pressure in the cylinder PC is controlled by a regulating valve RV which may be adjusted by a lever arm 28 that is actuated in one direction by a cross-arm 29 and in the other direction by a spring 31.

The cross-arm 29 may be actuated by either an accelerating pedal AP or a braking pedal BP. When pressure on the pedals is released, the lever 28 is returned to the position shown in the drawing by the spring 31, and the pedals AP and BP are returned to their normal positions by springs 32 and 33, respectively. The regulating valve RV is of such a construction that the pressure maintained in the cylinder PC is in direct proportion to the movement of either the accelerating pedal AP or the braking pedal BP.

An electrically-operated check valve CK is provided in the fluid line between the regulating valve RV and the cylinder PC. The operation of the check valve CK is controlled by a limit relay LR, the actuating coil of which is connected in the traction motor circuit and is, therefore, responsive to the motor current during both acceleration and dynamic braking. The actuating coil of the relay LR is divided into two sections, only one of which is utilized during acceleration, and both of which are utilized during dynamic braking, thereby changing the calibration of the relay LR during braking. Thus, if the motor current exceeds a predetermined amount, the supply of pressure fluid to the cylinder PC is cut off by the check valve CK, and movement of the controller C is stopped until the motor current is reduced and the check valve opened by the operation of the relay LR.

In order to permit the controller C to be returned rapidly to its initial position when the manually operated pedals AP and BP are released, an electrically-operated dump valve DP is also provided in the fluid line between the regulating valve RV and the cylinder PC. The operation of the dump valve DP is so controlled by interlocking means provided on the switches LS and B that the valve is opened to permit the rapid exhaustion of the pressure fluid from the cylinder PC when these switches are opened at the end of the accelerating or the braking cycles.

A manually operable controller MC is provided for controlling the operation of the reversing switches and for controlling the supply of control current to a controller drum AC which is actuated by the accelerating pedal AP, and a controller drum BC which is actuated by the braking pedal BP.

When either the acceleration control drum AC or the braking control drum BC is maintained in an operating position, and the line switch LS or the main braking switch B is closed, the dump valve DP is energized and the vent from the air cylinder PC to atmosphere is closed. If, however, either pedal is released, then the corresponding control drum is spring returned to the off position, the switch LS or the switch B is opened, the dump valve DP is deenergized, and air is released from the cylinder PC, thereby permitting the controller C to be returned to its initial position by the spring 24. Electrical interlocking is provided which prevents either the line switch LS or the braking switch B from closing again until the controller C has returned to the first position. Even if pressure is immediately applied to either the pedal AP or the pedal BP, upon the releasing of the other pedal, the controller C cannot then be held in an operating position, but will return to the first position ready to respond to operation of either pedal. Mechanical interlocking prevents simultaneous operation of both pedals in a manner well known in the art.

In order that the functioning of the foregoing apparatus may be more clearly understood, the operation of the system will now be described in more detail. Assuming that it is desired to accelerate the vehicle in a forward direction, the controller MC is actuated to the forward position and the pedal AP is depressed, thereby actuating the lever arm 28 to adjust the setting of the regulating valve RV which, in turn, controls the fluid pressure on the piston 27 in the cylinder PC which actuates the gear sector 26 to drive the controller C.

When the pedal AP is depressed, the controller AC is actuated to establish an energizing circuit for the actuating coil of the switch LS which may be traced from positive at the controller MC through conductor 42, a contact segment 43 on the controller AC, conductor 44, a contact segment 45 on the controller BC, conductor 46, an interlock 47 on the switch B, conductor 48, the actuating coil of the switch LS, conductor 49, and a contact segment 51 on the controller C to negative. A holding circuit for the switch LS is established through an interlock 52 upon the closing of the switch.

At this time, the reversing switches F1 and F2 are also closed. The energizing circuit for the switch F1 extends from the controller MC through conductor 53, a contact segment 54 on the controller AC, conductor 55, a contact segment 56 on the controller BC, conductor 57, an interlock 58 on the switch R1, conductor 59 and the actuating coil of the switch F1 to negative. The energizing circuit for the switch F2 extends from the conductor 53 through a contact segment 61 on the controller AC, conductor 62, an interlock 63 on the switch R2, and the actuating coil of the switch F2 to negative.

At this time, the actuating coil for the dump valve DP is also energized through a circuit which extends from the conductor 62 through an interlock 64 on the switch F2, conductor 65, the actuating coil of the valve DP, conductor 66, and an interlock 67 on the switch LS to negative. The actuating coil for the check valve CK is also energized to open the check valve. The energizing circuit for the valve CK may be traced from the conductor 55 through an interlock 36 on the switch F1, conductor 37, the contact members of the relay LR, conductor 38, the actuating coil of the check valve CK, conductor 66, and the interlock 67 on the switch LS to negative.

The closing of the switches LS, F1 and F2 connects the traction motor TM across the power conductors 12 and 15 in series-circuit relation with the resistor R. As explained hereinbefore, the operation of the pedal AP results in the advancement of the controller C, thereby shunting the resistor R from the motor circuit step-by-step to accelerate the motor TM. The rate of acceleration depends upon the distance to which the pedal AP is advanced, thereby adjusting the regulating valve RV. The maximum rate is determined by the setting of the limit relay LR which, as explained hereinbefore, controls the operation of the check valve CK to interrupt the flow of air or other pressure fluid to the cylinder PC. When the check valve CK is closed, the advancement of the controller C is stopped until the valve CK is opened as a result of the closing of the contact members of the relay LR.

As explained hereinbefore, the resistor R is shunted from the motor circuit by the advancement of the controller C through the various operating positions, thereby accelerating the motor TM to its maximum speed. Any desired intermediate speed can be selected by holding the accelerating pedal AP at a position corresponding to the desired speed. The regulating valve RV will function to so control the pressure in the cylinder PC that the controller C is not actuated beyond the position corresponding to that of the pedal AP.

If it is desired to decelerate the vehicle, the pedal AP is released and the pedal BP depressed. As explained hereinbefore, when the pedal AP is released, the controller AC is returned to the position shown in the drawing and the switches LS, F1 and F2 are opened to disconnect the motor from the power circuit. Furthermore, the opening of the switch LS deenergizes the actuating coil for the dump valve DP, thereby permitting the controller C to be returned to its initial position by the spring 24.

The operation of the brake pedal BP actuates the cross-arm 29 and the lever arm 28 in the manner hereinbefore described to adjust the regulating valve RV. The pedal BP also operates the controller drum BC to close the switches B, E, F2 and R1 to establish a dynamic braking motor circuit for the motor TM. The energizing circuit for the switch B may be traced from the controller MC through conductor 42, a contact segment 68 on the controller BC, conductor 69, an interlock 71 on the switch LS, conductor 72, the actuating coil of the switch B, conductor 73, and a contact segment 74 on the controller C to negative. A holding circuit for the switch B is established through an interlock 75 upon the closing of the switch B.

The energizing circuit for the switch E extends from the conductor 72 through the actuating coil of the switch E, conductor 76, and the contact segment 51 on the controller C to negative. The energizing circuit for the switch F2 extends from the conductor 53 through a contact segment 77 on the controller BC, conductor 62, the interlock 63 on the switch R2, and the actuating coil of the switch F2 to negative. The energizing circuit for the switch R1 extends from the conductor 53 through a contact segment 78 on the controller BC, conductor 79, an interlock 81 on the switch F1, and the actuating coil of the switch R1 to negative.

It will be noted that it is necessary for the controller C to return to its initial position before the foregoing switches can be closed to establish a dynamic braking circuit for the motor. Furthermore, the dump valve DP, which was opened when the switch LS opened, cannot be closed until the switch B is closed to establish an energizing circuit for the actuating coil of the dump valve through an interlock 80 on the switch B. Thus the return of the controller C to its initial position cannot be blocked even though the brake pedal BP is depressed immediately after the release of the pedal AP.

The closing of the switches B and R1 establishes a dynamic braking circuit for the motor TM through the resistors R and 19. This dynamic braking circuit includes the series field winding 11 and both sections of the actuating coil of the limit relay LR. The field winding 11 is also connected across the power conductors 12 and 15 by the closing of the switches E and F2, thereby separately exciting the field winding 11 and insuring a prompt building up of the dynamic braking effect. The resistors 18 and 19 are included in the excitation circuit for the field winding 11.

The controller C is advanced by the fluid pressure device PC under the control of the braking pedal BP in a manner similar to the operation under the control of the accelerating pedal AP. As the controller C is advanced, the resistor R is shunted from the motor circuit step-by-step in the same manner as during acceleration. The maximum rate of braking is determined by the limit relay LR which controls the operation of the check valve CK in the manner hereinbefore described.

The braking pedal BP may be released at the end of the braking cycle and the controller C then returned to its initial position to begin an accelerating cycle. The dump valve DP is opened as a result of the releasing of the pedal BP and cannot be reclosed until the controller C has returned to its initial position.

From the foregoing description, it is apparent that I have provided for the satisfactory operation of a control system which is suitable for controlling the operation of electrically propelled vehicles, and which insures the proper operation of the system even though the manually operated control devices of the system are improperly operated by the operator of the vehicle.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, manually operable means for adjusting said regulating means to control said fluid pressure, valve means for releasing the pressure fluid from said fluid-pressure means independently of said regulating means, and means actuated by said manually operable means and co-operating with said switching means to control the operation of said valve means.

2. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, manually operable means for adjusting said regulating means to control said fluid pressure, electrically-operated valve means for releasing the pressure fluid from said fluid-pressure means independently of said regulating means, and means actuated by said manually operable means and co-operating with said switching means to control the operation of said electrically-operated valve means.

3. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, a plurality of manually operable means individually operable to adjust said regulating means to control said fluid pressure, valve means for releasing the pressure fluid from said fluid-pressure means independently of said regulating means, and means actuated by any one of said manually operable means and co-operating with said switching means to control the operation of said valve means.

4. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, a plurality of manually operable means individually operable to adjust said regulating means to control said fluid pressure, electrically-operated valve means for releasing the pressure fluid from said fluid-pressure means independently of said regulating means, and means actuated by any one of said manually operable means and co-operating with said switching means to control the operation of said valve means.

5. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, a plurality of manually operable means individually operable to adjust said regulating means to control said fluid pressure, electrically-operated valve means for releasing the pressure fluid from said fluid-pressure means independently of said regulating means, and means actuated by any one of said manually operable means and co-operating with said switching means to control the operation of said valve means and prevent the reapplication of pressure to said fluid-pressure means prior to the return of said controller to a predetermined position.

6. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, a plurality of manually operable means individually operable to adjust said regulating means to control said fluid pressure, electrically-operated valve means for releasing the pressure fluid from said fluid-pressure means independently of said regulating means, control means actuated by any one of said manually operable means and co-operating with said switching means to control the operation of said valve means, and additional control means co-operating with said control means to prevent the reapplication of pressure to said fluid-pressure means prior to the return of said controller to a predetermined position.

7. In a control system for a motor, in combination, a resistor for controlling the motor current, a controller for shunting said resistor step-by-step, switching means controlled by said controller for controlling the operation of said motor, fluid-pressure means for actuating said controller, regulating means for varying the fluid pressure on said fluid-pressure means, a plurality of manually operable means individually operable to adjust said regulating means to control said fluid pressure, electrically-operated valve means for releasing the pressure fluid from said fluid-pressure means independently of said regulating means, control means actuated by any one of said manually operable means and co-operating with said switching means to control the operation of said valve means, and additional control means associated with said controller and cooperating with said control means to prevent the reapplication of pressure to said fluid-pressure means prior to the return of said controller to a predetermined position.

WILLIAM M. HUTCHISON.

REFERENCES CITED

The following references are of record in the file of this patent:

UNITED STATES PATENTS

| Number | Name | Date |
| --- | --- | --- |
| 1,005,420 | Darlington | Oct. 10, 1911 |
| 1,595,755 | Brooks | Aug. 10, 1926 |
| 2,000,727 | Wilby | May 7, 1935 |
| 2,198,029 | Farmer | Apr. 23, 1940 |